(12) United States Patent
Skupien

(10) Patent No.: US 6,369,498 B1
(45) Date of Patent: Apr. 9, 2002

(54) ELECTRON GUN FOR ADDRESSING SECONDARY EMISSION TARGETS

(75) Inventor: Thomas A. Skupien, Frankfort, KY (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/433,063

(22) Filed: Nov. 3, 1999

(51) Int. Cl.[7] .......................... H01J 31/00; H01J 29/00; H01J 3/02; H01J 3/06
(52) U.S. Cl. .................. 313/414; 313/412; 313/421; 313/409; 313/441; 313/396; 315/369; 315/364; 315/382; 315/386; 315/3
(58) Field of Search .................. 313/391, 414–417, 313/396, 421, 426, 441, 409; 315/3, 369, 364, 382, 386, 5.34

(56) References Cited

U.S. PATENT DOCUMENTS

| 2,339,662 A | * | 1/1944 | Teal | 178/7.2 |
| 2,682,010 A | | 6/1954 | Orthuber | 315/3 |
| 3,921,025 A | * | 11/1975 | Odenthal | 313/457 |
| 3,970,889 A | * | 7/1976 | Cobb | 313/396 |
| 4,119,883 A | | 10/1978 | Miyaoka | 313/414 |
| 4,744,636 A | | 5/1988 | Haven et al. | 350/331 R |
| 4,765,717 A | | 8/1988 | Buzak et al. | 350/331 R |
| 4,884,874 A | | 12/1989 | Buzak et al. | 350/336 |
| 5,822,110 A | | 10/1998 | Dabbaj | 359/293 |

OTHER PUBLICATIONS

R. Noel Thomas, et al., "The Mirror–Matrix Tube: A Novel Light Valve for Projection Displays", IEEE Transactions on Electron Devices, vol. ED–22, No. 9, Sep. 1975.
B. James Ross, et al., Performance Characteristics of the Deformographic Storage Display Tube (DSDT), 1973 IEEE Intercon Technical Papers Mar. 26–30, 1973,pp. 1–8.
Duane A Haven, IEEE Transactions on Electron Devices, Vo. ED–30, No. 5, 489–492, May 1983.

* cited by examiner

Primary Examiner—Nimeshkumar D. Patel
Assistant Examiner—Sikha Roy
(74) Attorney, Agent, or Firm—Blakely, Sokoloff, Taylor & Zafman LLP

(57) ABSTRACT

A dual-gun, single neck CRT focuses two beams, with significantly differing energies, onto a secondary emission target while maintaining compatibility with a standard fourteen-rotation stem and achieving FTU in excess of 95%. A pair of Einzel guns (write and erase) are mounted in parallel and aligned in the vertical direction rather than the horizontal inside the CRT. The write and erase guns are configured to share a common second accelerator electrode, a common final accelerator electrode, mounting beads and a magnetic deflection yoke. The guns' focus voltages are independently adjusted so that both the write and erase beams have the same focal length.

14 Claims, 3 Drawing Sheets

ELECTRON GUN FOR ADDRESSING SECONDARY EMISSION TARGETS

BACKGROUND OF THE INVENTION

1. Field of the Invention

This invention relates to cathode ray tubes (CRTs) and more specifically to a CRT in which a pair of electron guns are used to write and erase an image on a target via secondary electron emission.

2. Description of the Related Art

Electron guns are used to write and erase a charge pattern onto a beam-addressing surface of a light valve target. The charge pattern imparts a modulation onto a light beam in proportion to the pixel intensities and directs the modulated light beam through projection optics to form a video display. Such beam-addressed light valve targets have been demonstrated using transmissive and reflective liquid crystals, reflective membranes, deformable mirror layers and pixelated micromirror arrays.

Most of these targets utilize the secondary electron emission characteristics of the addressing surface to write and erase the charge pattern. The addressing surface is characterized by a secondary electron emission curve that plots the emission coefficients $\delta$ i.e. the ratio of emitted secondaries to incident primaries, against the landing energy of the primary electrons. At landing energies between first and second crossover points ($\delta 1$), the surface exhibits a coefficient greater than one. Outside that region, the surface exhibits a coefficient less than one. In general, clean conductors have coefficients less than one and insulators have coefficients greater than one for useful beam energies.

In known systems, the write gun emits primary electrons that strike the target's addressing surface with a landing energy above the first crossover causing more secondary electrons to be ejected than incident primary electrons. The secondaries are collected by a collector electrode (grid or plate), that is held at a relatively positive potential with respect to the addressing surface. This produces a charge pattern that has a positive net charge, which increases the pixel potentials and in turn actuates the liquid crystal, membrane, reflective layer or micromirror to modulate the light. The degree of modulation is controlled by changing the beam current.

In video applications, each charge pattern or frame must be erased prior to the next pass of the write gun. It is well known that the brightness of the light modulator is closely tied to the optical throughput of the target. In large part, optical throughput is determined by the frame time utilization of each pixel, i.e. how long the pixel is held in its modulated position before it is erased. Ideally, each pixel would be held at its intended modulated position until that pixel was to be rewritten and then instantaneously erased. This would maximize the amount of light passed through the projection optics while maintaining video performance.

A common erasure technique is RC decay, in which the deposited charge is bled off over the frame time. The device's RC time constant must be short enough that the pixel intensity is erased prior to writing the next value in order to maintain video performance. The main drawback, however, is the fact that approximately two-thirds of the available light is lost due to RC decay. This greatly limits the display's brightness and contrast capabilities.

In the 1950s, U.S. Pat. No. 2,682,010 to Orthuber and entitled "Cathode-Ray Projection Tube" introduced scanning an electron beam over a transparent dielectric element suspended above an array of reflective "flaps". The deposited charge pattern exerts electrostatic forces on the flaps causing them to deflect and form a projected image.

Orthuber suggests two possible ways to erase the charge pattern, the traditional RC decay as shown in his FIG. 3 and the use of a separate erase gun as shown in his FIG. 4. The erase gun operates between the first and second crossovers and leads the write beam by a short interval, such as one or two periods of the horizontal sweep frequency, so that each pixel is restored to reference potential shortly before being subjected to the write beam.

As shown in his FIG. 4, Orthuber suggests placing "two complete beam generating or deflecting systems", i.e. the write and erase guns in a single off-axis neck. Orthuber's double bi-potential guns each have an emitter (cathode); a wehnelt suppressor electrode (biasing electrode), a focusing electrode, a set of vertical electro-static deflection plates and a set of horizontal electro-static deflection plates. Based upon the drawing, the Orthuber guns do not have standard triodes. Ordinarily, the triode is comprised of an emitter, a Wehnelt suppressor electrode and a first accelerator.

The Orthuber guns use the focusing electrode to function as both the focusing electrode and the first accelerator. This is extremely bad practice. In fact, this gun would not function properly. Since Orthuber shows a target that is tilted by 45° the device would require dynamic focus voltage correction. If a dynamic voltage were applied to the focusing electrode, which functions as a first accelerator, then the cathode emission would modulate uncontrollably.

Orthuber also shows horizontal deflection plates directly in front of the focusing electrode. The volume between the focusing electrode and the horizontal deflection plates forms the main lens of a bi-potential type electron gun. The main lens in Orthuber's gun is not rotationally symmetric. This configuration would cause uncontrollable astigmatism and cause the electron gun to not function properly.

By placing two complete beam generating systems in a single neck in the manner depicted in FIG. 4, Orthuber's CRT would require a specially designed and manufacturer stem to bring the external potentials inside the single neck. Orthuber's design would require a 22-pin rotation stem with two isolated high voltage pins (one for each focusing potential), four open pins (two on each side of the high voltage pins) and sixteen low voltage pins. This would be very difficult to fit inside the neck glass without having arcing between the pins and would be very expensive to manufacture.

In the early 1970s, Westinghouse Electric Corporation developed an electron gun addressed cantilever beam deformable mirror device, which is described in R. Thomas et al., "The Mirror-Matrix Tube: A Novel Light Valve for Projection Displays," ED-22 IEEE Tran. Elec. Dev. 765 (1975) and U.S. Pat. Nos. 3,746,310, 3,886,310 and 3,896, 338. A low energy scanning electron beam deposits a charge pattern directly onto cloverleaf shaped mirrors causing them to be deformed toward a reference grid electrode on the substrate by electrostatic actuation. Erasure is achieved by raising the target voltage to equal the field mesh potential while flooding the tube with low energy electrons to simultaneously erase all of the mirrors, i.e. the whole frame. This approach improves the modulator's FTU but produces "flicker", which is unacceptable in video applications.

At the same time IBM was developing the DSDT as described by James Ross and Eugene Kozol's paper entitled "Performance Characteristics of the Deformographic Storage Display Tube (DSDT)" IEEE Intercon Technical Papers, Session 7, pp. 1–8, 1973. The DSDT is a dielectric membrane (target), which consists of an electronically controllable storage substrate, a deformable material layer, and a reflective layer. The target is mounted in the tube envelope so the storage substrate faces the electron gun. The deformable material with its conformal reflective layer is isolated in the separate front chamber of the tube. Deformations are created in the deformable material as the result of negative electrostatic charges deposited by the on-axis write gun, which is operated above the second crossover. These deformation are converted into a visual image by the off-axis schlieren optical systems. The charge pattern is erased by an off-axis flood erase gun that operates between the first and second crossovers. Electronic control of these guns provides for storage mode, variable persistence mode and selective erase modes of control.

In the late seventies and early eighties, Tektronix pioneered the development of an electron beam addressed liquid crystal light valve of the cathode-ray tube type as described in Duane A. Haven, *IEEE Transactions on Electron Devices,* Vol. ED-30, No. 5, 489–492, May 1983. Haven's light valve is a form of cathode-ray tube (CRT) having a twisted nematic liquid crystal cell, one substrate surface of which serving as a target for a writing electron beam propagating in the tube. The target substrate comprises a thin sheet of dielectric material and forms one face of the liquid crystal cell.

The CRT also includes a writing electron gun, a flood electron gun, and a ring-type collector electrode positioned adjacent the periphery of the target surface. The flood electron gun maintains the target surface of the cell at a desired operating electrostatic potential VFG, which is the potential of the flood electron gun cathode. Polarized light propagating from an external source enters the CRT through an optically transparent entry window on one side of the tube and passes through the cell and out through an exit window. The writing and flood guns are mounted at oblique angles relative to the target substrate to keep them out of the light path. Unwritten areas of the liquid crystal cell remain in an "OFF" state that rotates by 90 degrees the polarized direction of the light emanating from the external source. Areas addressed by the writing beam are temporarily switched into an "ON" state that leaves unchanged the polarization direction of the light emanating from the external source. This creates a light image pattern that is detected by an analyzing polarizer positioned in the path of light exiting the exit window.

The transparent collector electrode of the light valve of Haven is operated at a potential VCOL, which is positive relative to the potential VFG of the target surface. The flood gun electrons strike the target surface with an energy that is below the first crossover point on the secondary electron emission ratio curve for the dielectric material forming the target surface. Under these conditions, the electrostatic potential of the target surface is stabilized to the potential of the flood gun cathode. The writing gun is operated under conditions so that the writing beam electrons strike the target surface with an energy that is above the first crossover point but below the second crossover point of the dielectric material.

When the writing beam strikes the target surface, secondary emission causes the written area to charge positive relative to the unwritten areas of the target surface, which are at the flood gun potential VFG. The potential of the written area rises, approaching the potential VCOL of the collector electrode and driving the liquid crystal cell into the "ON" state. After the writing beam is turned off, the potential drops back to the flood gun cathode potential VFG and allows the liquid crystal cell to relax to the "OFF" state. This occurs because VCOL is below the first crossover point and more electrons are absorbed than are emitted from the previously written area.

The ring-type collector electrode is positioned adjacent the periphery of the liquid crystal cell and outside the projection light path through the valve. There is a relatively large separation between the collector electrode and the central areas of the target surface, Which separation causes the collection of secondary electrons emitted from the central areas on the target surface to be relatively inefficient. The reason for such inefficiency is that secondary electrons emitted from the central areas on the target surface redeposit on the positively charged, previously written areas of the target surface. This redeposition of secondary electrons at least partly erases the written image, thereby reducing the resolution and contrast capability of the light valve.

A different technique for erasing a beam addressed liquid crystal light valve is presented in U.S. Pat. Nos. 5,765,717 and 5,884,874. The transparent collector electrode is segmented into four or more electrically isolated segments. As the erase and write guns raster scan the light valve, with the write gun lagging by two segments, a controller switches the potentials on the segments above the erase and write guns to ground and to +300V with respect to the incident surface. Since both guns operate at energies above the crossover point, the erase gun secondaries will redeposit themselves over the segment thereby erasing the charge pattern and the write gun secondaries will be collected by the segment thereby writing a new charge pattern.

Although this approach provides improved resolution and contrast, it requires a segmented grid and a synchronized controller. Since both guns operate above the cross-over, image resolution can be further improved by coating the entire surface of the LCLV with a material such as magnesium oxide (MgO), which exhibits a very high emission coefficient, as described in U.S. Pat. No. 4,744,636. However, the best FTU that can be achieved using the segmented grid is (n−2)/n where n is the number of segments. For example, a 4 segment grid would have only a 50% FTU.

SUMMARY OF THE INVENTION

In view of the above problems, the present invention provides a dual-gun, single neck CRT that focuses two beams, with significantly differing energies, onto a secondary emission target while maintaining compatibility with a standard fourteen-rotation stem and achieving FTU in excess of 95%.

This is accomplished by sharing certain gun parts while maintaining independent control over others. A pair of Einzel guns (write and erase) are mounted in parallel and aligned in the vertical direction rather than the horizontal inside the CRT. The write and erase guns are configured to share a common second accelerator electrode, a common final accelerator electrode, mounting beads and a magnetic deflection yoke. Inside each gun, a single stem pin is connected to the negative filament lead and the cathode. The bias on the erase gun's positive filament is stepped up to lower the effective landing energy of the erase beam. The write and erase guns have different sized main lenses and sit off-axis by differing amounts. To compensate, the focus voltages are independently adjusted so that both the write and erase beams have the same focal length.

These and other features and advantages of the invention will be apparent to those skilled in the art from the following detailed description of preferred embodiments, taken together with the accompanying drawings, in which:

DETAILED DESCRIPTION OF THE INVENTION

The dual-Einzel gun of the present invention provides the ability to write and erase a secondary emission target in a CRT using a single on-axis neck and a standard 14-pin rotation stem. The manufacturing of an off-axis and particularly a two-axis neck and a specialty stem would be very expensive. The present design is capable of high resolutions and FTUs in excess of 95%, which translates into a brighter image. This is accomplished by sharing certain gun parts while maintaining independent control over others.

Figure 1:
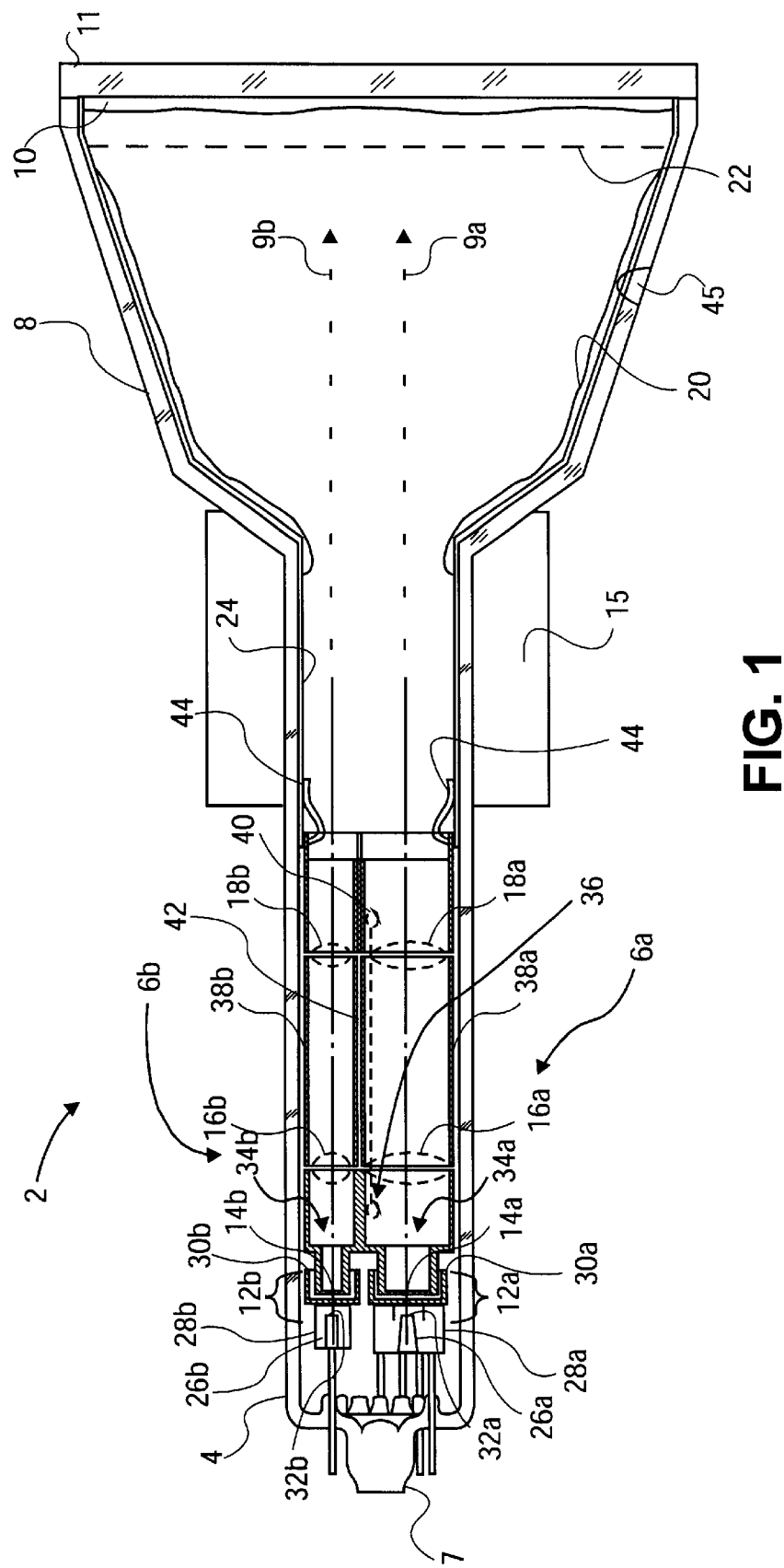
FIG. 1 is a section view of a CRT with a secondary emission target in accordance with the present invention.
Figure 2:
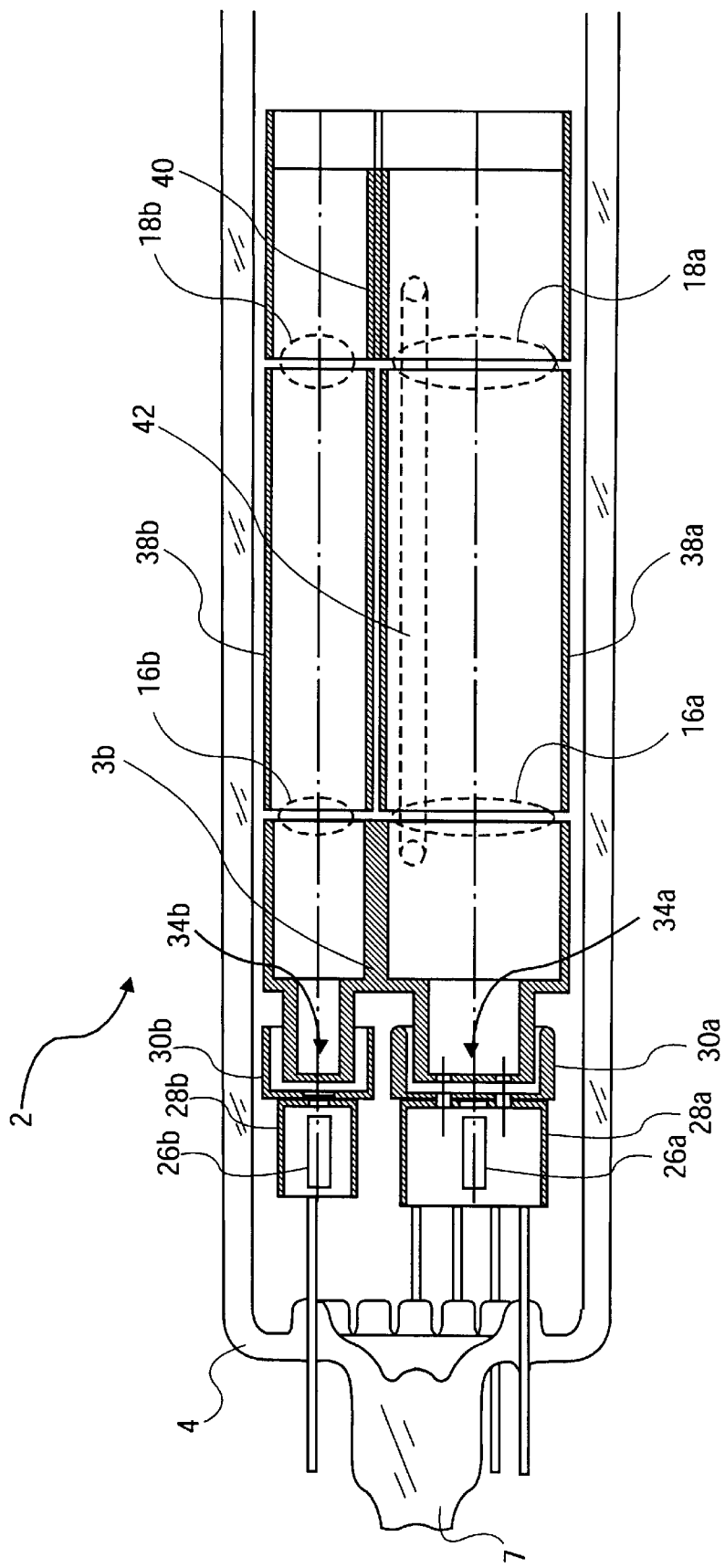
FIG. 2 is a section view of the dual-Einzel gun shown in FIG. 1.

As shown in FIGS. 1 and 2, CRT 2 includes a neck glass 4 that houses a pair of Einzel guns; write gun 6a and erase gun 6b, a shared magnetic deflection yoke 15 that deflects the write and erase beams, a standard 14-pin stem 7 that brings voltage to the gun parts, a funnel 8 that is tapered to accommodate the deflection of beams 9a and 9b, and a target 10 on cover glass 11. Each electron gun is comprised of two or more optical parts; a triode (12a, 12b) that forms the beam, a pre-focus lens (14a,14b) and two main lenses 16a,16b and 18a,18b that focus the beams at the target with different landing energies. The funnel has a reactive coating 20, typically barium, which neutralizes the poisonous byproducts that are out gassed by the triode's cathode element (and other parts of the CRT).

Write gun 6a emits a pencil-like beam 9a of primary electrons that strike the target's addressing surface with a landing energy above the first crossover causing more secondary electrons to be ejected than incident primary electrons. The secondaries are collected by a collector electrode 22, which is held at a relatively positive potential with respect to the addressing surface. Alternately, the CRT's internal conductive coating 24, which is held at anode potential, can be used to collect the secondaries. This produces a charge pattern that has a positive net charge, which increases the pixel potentials and in turn actuates the liquid crystal, membrane, reflective layer or micromirror to modulate the light. The degree of modulation is controlled by changing the beam current. Erase gun 6b emits a broader beam 9b that leads write beam 9a by a small amount and strikes the target's addressing surface with a landing energy between the first and second crossovers thereby neutralizing the charge pattern. By aligning the guns vertically inside the CRT with respect to the raster scan rather than horizontally as is commonly done in color guns to ensure proper convergence, the differences in raster size between the two guns can be canceled by manipulating the video signal that is applied to the cathode of the Wehnelt electrodes. This technique is much easier than manipulating the deflection yoke waveform.

Triodes 14a, 14b are made up of a cathode (26a,26b), a Wehnelt suppressor electrode (28a,28b) and an extractor electrode (30a,30b). The triodes are designed to provide beams that are optimized for their respective main lens sizes. The erase cathode 26b is biased above the write cathode 26a by a few kilovolts to reduce its landing energy. The heating of the cathode during operation causes the electrons to be emitted at the cathode surface 32a, 32b. The electrons are then pushed back to the cathode surface by the suppressor electrode. But, the suppressor electrode has an optical aperture that allows an extraction voltage from the first accelerator to penetrate through the aperture 34a, 34b and strip electrons off of the cathode. This results in converging electron beams that cross over at an axial position somewhere between the suppressor electrode and the extractor electrode, typically referred to as the "first crossover".

The suppressor electrode effectively forms an iris, which the beam passes through. This iris can be opened or closed by varying the voltage on the suppressor electrode. If the biasing voltage is brought closer to the cathode voltage then the cathode's active emitting surface becomes larger in diameter. This active area serves as the object in the total optical system. While this voltage change allows more current to escape from the cathode it increases the object size for the optical system. A smaller active area corresponds to a smaller spot size, provided that the cathode is healthy enough to emit the required peak current densities.

Increasing the extraction voltage on the extractor electrode increases the biasing voltage required to "cutoff" the beam. This causes the active cathode surface to decrease in size but reduces the slope of the current vs. biasing voltage curve. This increase of the extraction voltage also increases the beam angle, which could be desirable or undesirable depending on the size of the main focusing lens. The extraction voltage is typically a variable voltage in the control electronics and is used to cancel slight differences in the gun's mechanical dimensions. The extraction voltage sets the "cut-off" of the gun to match the video electronics. Both guns are design to have similar cutoff voltages at a given extraction voltage.

Beams 9a, 9b are then sent through pre-focus lenses 14a, 14b (volume between extractor electrode 30a, 30b and a shared second accelerator electrode 36), first main lens 16a, 16b (volume between shared second accelerator electrode 36 and a focus electrode 38a, 38b) and second main lens 18a, 18b (volume between focus electrode 38a, 38b and a shared final accelerator electrode 40) that focus the beams at the target. The higher the potential differences between the electrodes the stronger the lensing effects. But, a stronger lens has more spherical aberration. Because the gun' main lenses differ in size, the lenses will respond differently to the same applied voltage. Also, since the beams differ in energy they will respond to identical lenses differently. As a result, each lens must have a separate focus voltage to independently focus each beam at the target.

In an Einzel gun the second accelerator electrode and final accelerator electrode (together the anode electrode) are both held at anode potential and the focus electrode is at a lower potential. Shared second accelerator electrode 36 is electrically connected to shared final accelerator electrode 40 via a jumper 42. Final accelerator electrode 40 is connected to internal conductive coating 24 on the inside of a neck glass 4 by a number of snubber springs 44. An anode button 45 in neck glass 4 connects coating 24 to anode potential.

The guns are mounted on shared mounting beads (not shown), which reduces the number of leads and jumpers required to operate the guns. As such, the total diameter of both main lenses is limited to the space between the mounting beads. The smaller the main lenses the greater the spherical aberration for a given beam size. Since spot-size is more critical in the write gun, its main lens is larger than the erase gun.

In addition to placing both the write and erase guns in a single on-axis neck, the present design is compatible with the standard cathode ray tube stem used in the color television industry. This stem uses a fourteen-position 0.600" diameter pin rotation designed to seal into the industry standard 29 mm neck glass. This standard pin rotation is available in two standard "29 mm stems." The first standard stem has a high voltage pin isolated from nine low voltage pins by means of a "silo." The stem uses two blank rotation positions on either side of the high voltage pin in order to allow space for the silo. The second standard 29 mm stem has two high voltage pins inside of a similar silo and thus has only eight low voltage pins out side of the silo. Other standard stems are available for different sized neck glass. Any deviation from the standard stems of the color television industry would be very costly. Not only would this change require a new stem but also new sockets and circuit boards.

Figure 3:
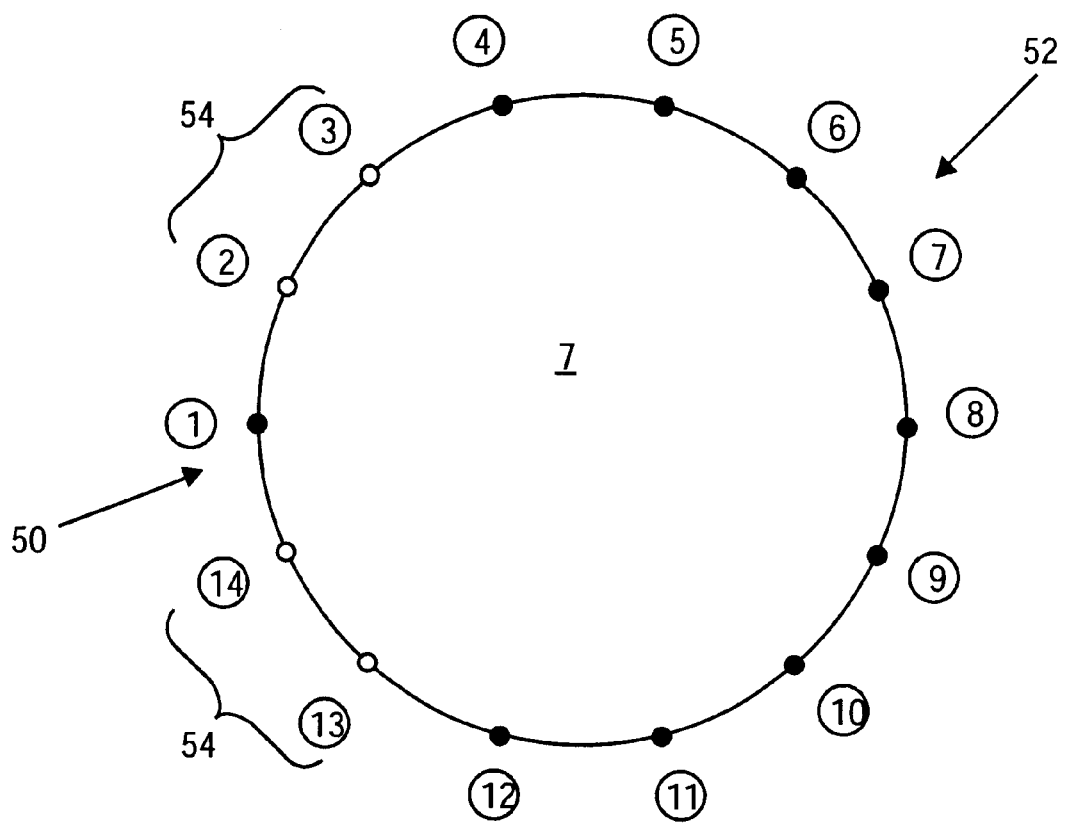
FIG. 3 is a diagram of the pin assignments for a standard 14-rotation stem for the dual-Einzel gun in accordance with the present invention.

As shown in FIG. 3, stem 7 is a standard fourteen-position stem with a single high voltage pin 50 that is isolated from the nine low voltage pins 52 by two blank rotation positions 54 on either side of it. The erase focus voltage is the highest voltage of all the stem pins so it is assigned to high voltage pin 50. The write gun's cathode and negative filament and the erase gun's cathode and negative filament each share a single pin. The major benefit is that two stem pins are saved thereby allowing the standard 14-position stem to be used. The draw back is that this may cause undesirable ground loops in the electronics. Also, the video should be applied to the Wehnelt suppressor electrode. Applying the video to the Wehnelt is not a standard technique so it would require custom video electronics. If the video is applied to the cathode then the filament would also modulate, which may cause filament temperature shifts.

The remaining pins are assigned so that the potential difference between any given adjacent stem pins does not exceed 2 kilovolts in order to avoid arcing. The positive and negative filament leads must be assigned adjacent to each other. The pairs of filament stem leads of the write and erase guns should be 180° from each other. This allows the filament stem lead to approach their respective gun from the side. It is acceptable to assign the wehnelt connection between the cathode and first accelerator stem leads.

While several illustrative embodiments of the invention have been shown and described, numerous variations and alternate embodiments will occur to those skilled in the art. For example, the dual-Einzel may be applied to other types of targets that require differing landing energies but do not involve secondary emission. Such variations and alternate embodiments are contemplated, and can be made without departing from the spirit and scope of the invention as defined in the appended claims.

I claim:

1. A CRT, comprising:
   a single neck;
   a stem in the neck having an isolated high voltage pin and multiple low voltage pins;
   a funnel attached to the neck;
   a target on the end of the funnel;
   a write gun in the neck including a triode that forms a write beam and a focusing lens having an anode electrode and a focus electrode that together focus the write beam onto the target; and
   an erase gun in the neck including a triode that forms an erase beam and a focusing lens having an anode electrode and a focus electrode that together focus the erase beam onto the target, said write and erase guns sharing a common anode electrode but having separate triodes that are biased with respect to each other such the landing energy of the write and erase beams are different and having separate focus electrodes whose voltages are independently controlled to focus the write and erase beams at the target.

2. The CRT of claim 1, wherein the funnel has an axis that is perpendicular to the target, the single neck gun being positioned on the axis.

3. The CRT of claim 1, wherein both the erase gun triode and the write gun triode comprise a cathode having a cathode lead and a filament having a negative filament lead and a positive filament lead, the erase gun cathode lead and the negative filament lead sharing one of the low voltage pins and the write gun cathode lead and the negative filament lead sharing another one of the low voltage pins.

4. The CRT of claim 1, wherein the stem is a standard color CRT 14-position stem.

5. The CRT of claim 1, wherein the target has an addressing surface that is characterized by a secondary electron emission curve at which the surface exhibits an emission coefficient greater than one for beam landing energies between first and second crossover points on the curve and exhibits an emission coefficient less than one for beam landing energies above the second crossover points, said triodes biased with respect to each other such the landing energies of the write and erase beams lies on opposite sides of the second crossover point.

6. The CRT of claim 1, wherein the write gun focusing lens has a larger diameter than the erase gun focusing lens.

7. The CRT of claim 1, wherein the write and erase guns are raster scanned across the target, the write and erase guns being aligned vertically inside the CRT with respect to the raster scan.

8. The CRT of claim 1, wherein the write and erase guns are Einzel guns.

9. A CRT, comprising:
   a single neck;
   a stem in the neck having an isolated high voltage pin and multiple low voltage pins;
   a funnel attached to the neck;
   a target on the end of the funnel, the target having an addressing surface that is characterized by a secondary electron emission curve at which the surface exhibits an emission coefficient greater than one for beam landing energies between first and second crossover points on the curve and exhibits an emission coefficient less than one for beam landing energies above the second crossover points;
   an Einzel write gun in the neck including a triode that forms a write beam that scans the target horizontally and a focusing lens having an anode electrode and a focus electrode that together focus the write beam onto the target; and
   an Einzel erase gun positioned in vertical alignment a with the write erase in the neck, the erase including a triode that forms an erase beam that scans the target horizontally and a focusing lens having an anode electrode and a focus electrode that together focus the erase beam onto the target, said write and erase guns sharing a common anode electrode but having separate triodes that are biased with respect to each other such the landing energy of the write and erase beams lie on opposite sides of the second crossover point and having separate focus electrodes whose voltages are independently controlled to focus the write and erase beams at the target.

10. The CRT of claim 9, wherein both the erase gun triode and the write gun triode comprise a cathode having a cathode lead and a filament having a negative filament lead and a positive filament lead, the erase gun cathode lead and the negative filament lead sharing one of the low voltage pins and the write gun cathode lead and the negative filament lead sharing another one of the low voltage pins.

11. The CRT of claim 10, wherein the stem is a standard color CRT 14-position stem.

12. A CRT, comprising:

a single neck;

a standard color CRT 14-position stem in the neck having an isolated high voltage pin, two blank pin locations on either side of the high voltage pin and nine low voltage pins;

a funnel attached to the neck;

a target on the end of the funnel;

an Einzel write gun in the neck including a triode that forms a write beam that scans the target horizontally and a focusing lens having an anode electrode and a focus electrode that together focus the write beam onto the target; and an Einzel erase gun positioned in vertical alignment with the write erase in the neck, the erase including a triode that forms an erase beam that scans the target horizontally and a focusing lens having an anode electrode and a focus electrode that together focus the erase beam onto the target, said write and erase guns sharing a common anode electrode but having separate triodes that are biased with respect to each other such the landing energy of the write and erase beams are different and having separate focus electrodes whose voltages are independently controlled to focus the write and erase beams at the target.

13. The CRT of claim 12, wherein both the erase gun triode and the write gun triode comprise a cathode having a cathode lead and a filament having a negative filament lead and a positive filament lead, the erase gun cathode lead and the negative filament lead sharing one of the low voltage pins and the write gun cathode lead and the negative filament lead sharing another one of the low voltage pins.

14. The CRT of claim 12, wherein the target has an addressing surface that is characterized by a secondary electron emission curve at which the surface exhibits an emission coefficient greater than one for beam landing energies between first and second crossover points on the curve and exhibits an emission coefficient less than one for beam landing energies above the second crossover points, said triodes biased with respect to each other such the landing energies of the write and erase beams lies on opposite sides of the second crossover point.

* * * * *

UNITED STATES PATENT AND TRADEMARK OFFICE
CERTIFICATE OF CORRECTION

PATENT NO.   : 6,369,498 B1
DATED        : April 9, 2002
INVENTOR(S)  : Skupien

It is certified that error appears in the above-identified patent and that said Letters Patent is hereby corrected as shown below:

Column 8,
Line 60, delete "a" at the end of the line.
Line 61, delete "erase" and insert -- gun --.

Column 9,
Line 30, delete "erase" and insert -- gun --.

Signed and Sealed this

Twenty-first Day of June, 2005

JON W. DUDAS
*Director of the United States Patent and Trademark Office*